US012701259B2

(12) United States Patent
Tian et al.

(10) Patent No.: US 12,701,259 B2
(45) Date of Patent: Aug. 4, 2026

(54) BASE MESH CODING IN MESH COMPRESSION

(71) Applicant: Tencent America LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 47 days.

(21) Appl. No.: 18/747,222

(22) Filed: Jun. 18, 2024

(65) Prior Publication Data

US 2024/0430471 A1      Dec. 26, 2024

Related U.S. Application Data

(60) Provisional application No. 63/522,048, filed on Jun. 20, 2023.

(51) Int. Cl.
H04N 19/50 (2014.01)
G06T 9/00 (2006.01)
(Continued)

(52) U.S. Cl.
CPC ............ H04N 19/50 (2014.11); G06T 9/001 (2013.01); H04N 19/124 (2014.11);
(Continued)

(58) Field of Classification Search
CPC .... H04N 19/50; H04N 19/124; H04N 19/136; H04N 19/167; H04N 19/91; G06T 9/001
See application file for complete search history.

(56) References Cited

U.S. PATENT DOCUMENTS

| | | | | |
|---|---|---|---|---|
| 11,854,112 | B1 * | 12/2023 | Mammou | ............... G06T 11/40 |
| 11,915,373 | B1 * | 2/2024 | Mammou | ............... G06T 15/04 |

(Continued)

FOREIGN PATENT DOCUMENTS

WO      WO-2024208852      *    4/2024

OTHER PUBLICATIONS

"Information technology—Coded representation of immersive media—Part 29: Video-based dynamic mesh coding (V-DMC)", WD stage. ISO 23090-29:2023(E), ISO/IEC JTC 1/SC 29/VG 7, Feb. 10, 2023, 74 pages.

(Continued)

*Primary Examiner* — Zaihan Jiang
(74) *Attorney, Agent, or Firm* — ARENTFOX SCHIFF LLP

(57) ABSTRACT

In a method, a position prediction of a current vertex of a base mesh associated with a mesh in a current mesh frame is determined. An attribute prediction of the current vertex is determined. The base mesh includes a subset of a plurality of vertices of the mesh. A position prediction residue for the position prediction of the current vertex is quantized to generate a quantized position prediction residue. An attribute prediction residue for the attribute prediction of the current vertex is quantized to generate a quantized attribute prediction residue. The quantized position prediction residue for the position prediction of the current vertex is entropy coded in a bitstream. The quantized attribute prediction residue for the attribute prediction of the current vertex is entropy coded in the bitstream.

20 Claims, 11 Drawing Sheets

(51) Int. Cl.
  H04N 19/124     (2014.01)
  H04N 19/136     (2014.01)
  H04N 19/167     (2014.01)
  H04N 19/91      (2014.01)
(52) U.S. Cl.
  CPC ......... H04N 19/136 (2014.11); H04N 19/167 (2014.11); H04N 19/91 (2014.11)

(56)                References Cited

U.S. PATENT DOCUMENTS

| | | | | |
|---|---|---|---|---|
| 2021/0090301 | A1* | 3/2021 | Mammou | .............. H04N 19/20 |
| 2023/0074762 | A1* | 3/2023 | Huang | ................... G06T 17/20 |
| 2023/0090677 | A1* | 3/2023 | Zhang | .................... G06T 9/001 |
| | | | | 382/100 |
| 2023/0105452 | A1* | 4/2023 | Zhang | ................. H04N 19/597 |
| | | | | 375/240.09 |
| 2023/0107834 | A1* | 4/2023 | Zhang | ................. H04N 19/597 |
| | | | | 382/232 |
| 2023/0143284 | A1* | 5/2023 | Xu | .......................... G06T 9/001 |
| 2023/0290063 | A1* | 9/2023 | Mammou | .............. G06T 9/001 |
| 2024/0185469 | A1* | 6/2024 | Joshi | ................... H04N 19/172 |
| 2024/0233190 | A1* | 7/2024 | Joshi | ....................... G06T 9/001 |
| 2025/0016337 | A1* | 1/2025 | Kammachi | ........... H04N 19/30 |
| 2025/0111547 | A1* | 4/2025 | Rondao Alface | ....... G06T 9/001 |

OTHER PUBLICATIONS

Mammou et al., "[V-CG] Apple's Dynamic Mesh Coding CfP Response", Apple Inc., International Organisation for Standardisation Organisation Internationale De Normalisation, ISO/IEC JTC 1/SC 29/WG 7 m59281, Coding of Moving Pictures and Audio, Apr. 2022, 24 pages.

* cited by examiner

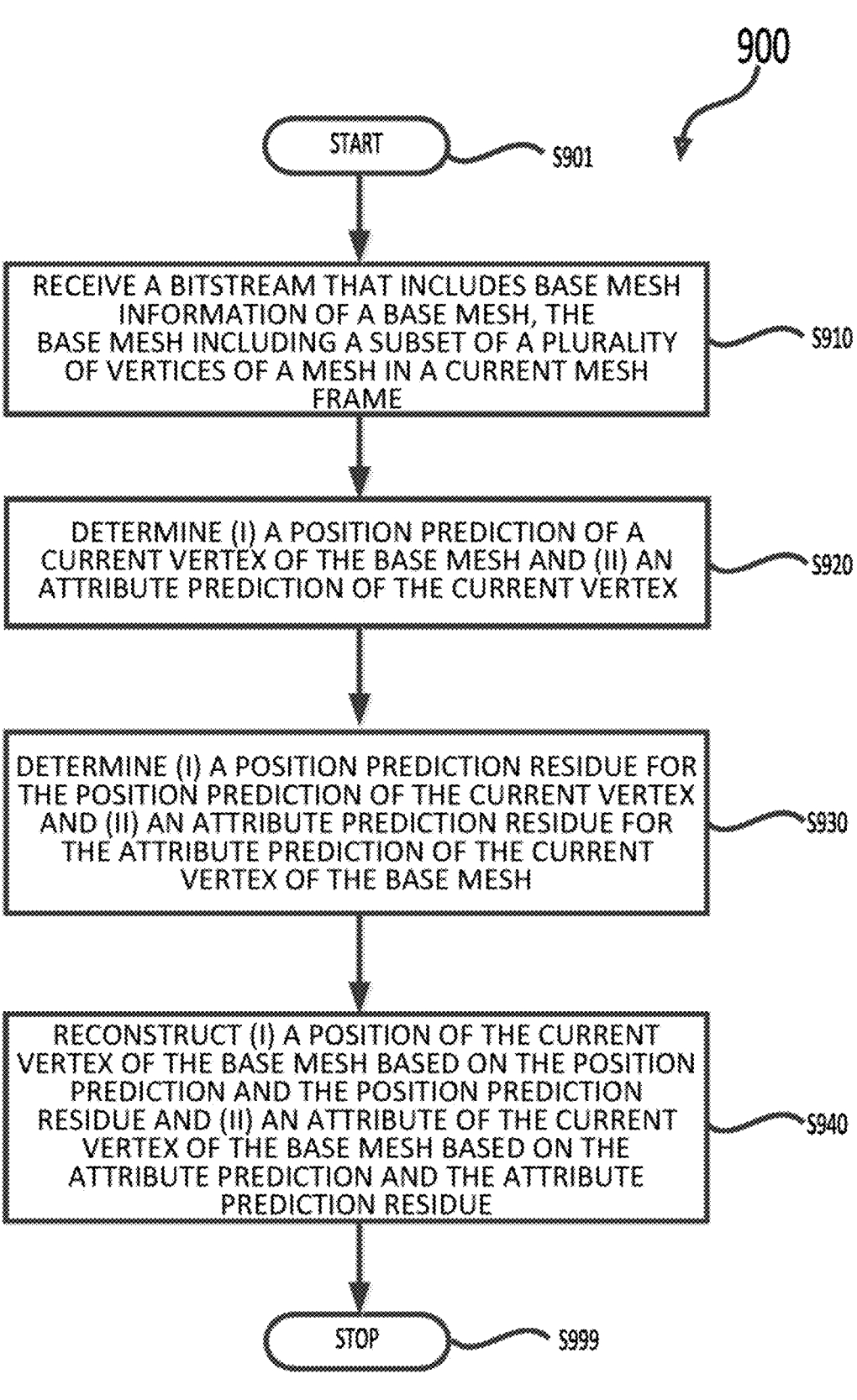

900

START — S901

RECEIVE A BITSTREAM THAT INCLUDES BASE MESH INFORMATION OF A BASE MESH, THE BASE MESH INCLUDING A SUBSET OF A PLURALITY OF VERTICES OF A MESH IN A CURRENT MESH FRAME — S910

DETERMINE (I) A POSITION PREDICTION OF A CURRENT VERTEX OF THE BASE MESH AND (II) AN ATTRIBUTE PREDICTION OF THE CURRENT VERTEX — S920

DETERMINE (I) A POSITION PREDICTION RESIDUE FOR THE POSITION PREDICTION OF THE CURRENT VERTEX AND (II) AN ATTRIBUTE PREDICTION RESIDUE FOR THE ATTRIBUTE PREDICTION OF THE CURRENT VERTEX OF THE BASE MESH — S930

RECONSTRUCT (I) A POSITION OF THE CURRENT VERTEX OF THE BASE MESH BASED ON THE POSITION PREDICTION AND THE POSITION PREDICTION RESIDUE AND (II) AN ATTRIBUTE OF THE CURRENT VERTEX OF THE BASE MESH BASED ON THE ATTRIBUTE PREDICTION AND THE ATTRIBUTE PREDICTION RESIDUE — S940

STOP — S999

*FIG. 9*

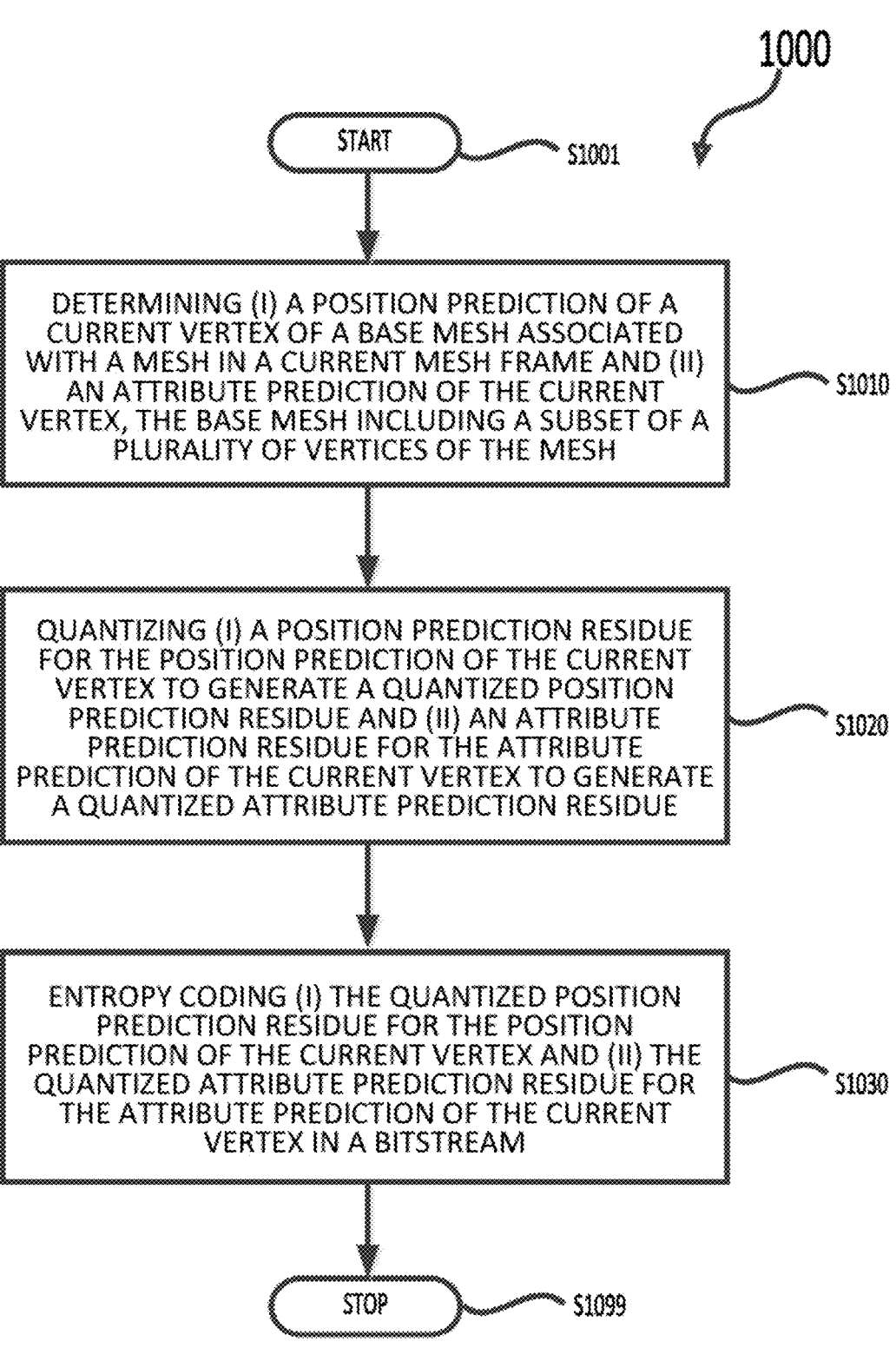

1000

START — S1001

DETERMINING (I) A POSITION PREDICTION OF A CURRENT VERTEX OF A BASE MESH ASSOCIATED WITH A MESH IN A CURRENT MESH FRAME AND (II) AN ATTRIBUTE PREDICTION OF THE CURRENT VERTEX, THE BASE MESH INCLUDING A SUBSET OF A PLURALITY OF VERTICES OF THE MESH — S1010

QUANTIZING (I) A POSITION PREDICTION RESIDUE FOR THE POSITION PREDICTION OF THE CURRENT VERTEX TO GENERATE A QUANTIZED POSITION PREDICTION RESIDUE AND (II) AN ATTRIBUTE PREDICTION RESIDUE FOR THE ATTRIBUTE PREDICTION OF THE CURRENT VERTEX TO GENERATE A QUANTIZED ATTRIBUTE PREDICTION RESIDUE — S1020

ENTROPY CODING (I) THE QUANTIZED POSITION PREDICTION RESIDUE FOR THE POSITION PREDICTION OF THE CURRENT VERTEX AND (II) THE QUANTIZED ATTRIBUTE PREDICTION RESIDUE FOR THE ATTRIBUTE PREDICTION OF THE CURRENT VERTEX IN A BITSTREAM — S1030

STOP — S1099

FIG. 10

BASE MESH CODING IN MESH COMPRESSION

INCORPORATION BY REFERENCE

The present application claims the benefit of priority to U.S. Provisional Application No. 63/522,048, "Base Mesh Coding in Mesh Compression" filed on Jun. 20, 2023, which is incorporated by reference herein in its entirety.

TECHNICAL FIELD

The present disclosure describes aspects generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

Advances in three-dimensional (3D) capture, modeling, and rendering have promoted 3D content across various platforms and devices. For example, a baby's first step in one continent is captured and grandparents may see (and in some cases interact) and enjoy a full immersive experience with the child in another continent. In order to achieve such realism, models are becoming more sophisticated, and a significant amount of data is linked to the creation and consumption of those models. 3D meshes are widely used to represent such immersive contents.

SUMMARY

Aspects of the disclosure include bitstreams, methods, and apparatuses for mesh processing. In some examples, an apparatus for mesh processing includes processing circuitry.

According to an aspect of the disclosure, an apparatus for mesh decoding is provided. The apparatus includes processing circuitry. The processing circuitry is configured to receive a bitstream that includes base mesh information of a base mesh. The base mesh includes a subset of a plurality of vertices of a mesh in a current mesh frame. The processing circuitry is configured to determine (i) a position prediction of a current vertex of the base mesh and (ii) an attribute prediction of the current vertex. The processing circuitry is configured to determine (i) a position prediction residue for the position prediction of the current vertex and (ii) an attribute prediction residue for the attribute prediction of the current vertex of the base mesh. The processing circuitry is configured to reconstruct (i) a position of the current vertex of the base mesh based on the position prediction and the position prediction residue and (ii) an attribute of the current vertex of the base mesh based on the attribute prediction and the attribute prediction residue.

In an example, the attribute of the current vertex is a two-dimensional (2D) texture coordinate of the current vertex. The attribute prediction is a 2D texture coordinate prediction. The attribute prediction residue is a 2D texture coordinate prediction residue.

In an example, the processing circuitry is configured to determine the position prediction of the current vertex based on one or more coded vertices according to a multi-parallelogram prediction. The processing circuitry is configured to determine the 2D texture coordinate prediction of the current vertex based on the one or more coded vertices according to a stretch prediction algorithm.

In an example, the processing circuitry is configured to determine a quantized position prediction residue for the position prediction of the current vertex based on a first entropy coding. The processing circuitry is configured to dequantize the quantized position prediction residue for the position prediction of the current vertex to determine the position prediction residue based on a first quantization step value. The processing circuitry is configured to determine a quantized 2D texture coordinate prediction residue for the 2D texture coordinate prediction for the current vertex based on a second entropy coding. The processing circuitry is configured to dequantize the quantized 2D texture coordinate prediction residue for the 2D texture coordinate prediction of the current vertex to determine the 2D texture coordinate prediction residue based on a second quantization step value.

In an example, the second quantization step value is determined based on the first quantization step value. A log 2 of a denominator of the first quantization step value is in a range between 0 and 7. The second quantization step value is one of 1, 2, 4, 8, 16, 32, 64, and 128. The first quantization step value is one of 1, 2, 4, 8, 16, 32, 64, and 128.

In an example, the second quantization step value is equal to a multiple of the first quantization step value.

In an example, the second quantization step value is equal to one of a linear function and a monotonically non-decreasing function of the first quantization step value.

In an example, the second quantization step value is equal to a monotonically non-decreasing function of a quantization error associated with the position prediction of the current vertex. The quantization error is a difference between the quantized position prediction residue and an unquantized position prediction residue for the current vertex.

In an example, the first quantization step value is determined based on the second quantization step value.

In an example, the first quantization step value is equal to a multiple of the second quantization step value.

In an example, the first quantization step value is equal to one of a linear function and a monotonically non-decreasing function of the second quantization step value.

In an example, the first quantization step value is equal to a monotonically non-decreasing function of a quantization error associated with the 2D texture coordinate prediction of the current vertex. The quantization error is a difference between the quantized 2D texture coordinate prediction residue and an unquantized 2D texture coordinate prediction residue for the current vertex.

In an aspect of the disclosure, a method of mesh encoding is provided. In the method, a position prediction of a current vertex of a base mesh associated with a mesh in a current mesh frame is determined. An attribute prediction of the current vertex is determined. The base mesh includes a subset of a plurality of vertices of the mesh. A position prediction residue for the position prediction of the current vertex is quantized to generate a quantized position prediction residue. An attribute prediction residue for the attribute prediction of the current vertex is quantized to generate a quantized attribute prediction residue. The quantized position prediction residue for the position prediction of the current vertex is entropy coded in a bitstream. The quantized attribute prediction residue for the attribute prediction of the current vertex is entropy coded in the bitstream.

In an example, the attribute of the current vertex is a two-dimensional (2D) texture coordinate of the current vertex. The attribute prediction is a 2D texture coordinate prediction. The attribute prediction residue is a 2D texture coordinate prediction residue.

In an example, the quantized position prediction residue for the position prediction of the current vertex is dequantized to obtain the position prediction residue of the position prediction of the current vertex. The quantized 2D texture coordinate prediction residue for the 2D texture coordinate prediction of the current vertex is dequantized to obtain the 2D texture coordinate prediction residue of the current vertex. A position of the current vertex is reconstructed based on the position prediction and the position prediction residue. A 2D texture coordinate for the current vertex is reconstructed based on the 2D texture coordinate prediction and the 2D texture coordinate prediction residue.

In an example, the position prediction of the current vertex is determined based on one or more coded vertices according to a multi-parallelogram prediction. The 2D texture coordinate prediction of the current vertex is determined based on the one or more coded vertices according to a stretch prediction algorithm.

In an example, the position prediction residue for the position prediction of the current vertex is quantized based on a first quantization step value. The 2D texture coordinate prediction residue for the 2D texture coordinate prediction of the current vertex is quantized based on a second quantization step value.

In an aspect of the disclosure, a method of mesh data processing is provided. In the method, a bitstream of the mesh data is processed according to a format rule. In an example, the bitstream includes base mesh information of a base mesh, where the base mesh includes a subset of a plurality of vertices of a mesh in a current mesh frame. The format rule specifies that (i) a position prediction of a current vertex of the base mesh and (ii) an attribute prediction of the current vertex are determined. The format rule specifies that (i) a position prediction residue for the position prediction of the current vertex and (ii) an attribute prediction residue for the attribute prediction of the current vertex of the base mesh are determined. The format rule specifies that (i) a position of the current vertex of the base mesh is processed based on the position prediction and the position prediction residue and (ii) an attribute of the current vertex of the base mesh is processed based on the attribute prediction and the attribute prediction residue.

Aspects of the disclosure also provide an apparatus for mesh encoding. The apparatus for mesh encoding including processing circuitry configured to implement any of the described methods for mesh encoding.

Aspects of the disclosure also provide a method for mesh decoding. The method including any of the methods implemented by the apparatus for mesh decoding.

Aspects of the disclosure also provide a non-transitory computer-readable medium storing instructions which, when executed by a computer, cause the computer to perform any of the described methods for mesh decoding, encoding, and mesh data processing.

BRIEF DESCRIPTION OF THE DRAWINGS

Further features, the nature, and various advantages of the disclosed subject matter will be more apparent from the following detailed description and the accompanying drawings in which:

FIG. 9 shows a flow chart outlining a mesh decoding process according to some aspects of the disclosure.

FIG. 10 shows a flow chart outlining a mesh encoding process according to some aspects of the disclosure.

DETAILED DESCRIPTION

Figure 1:
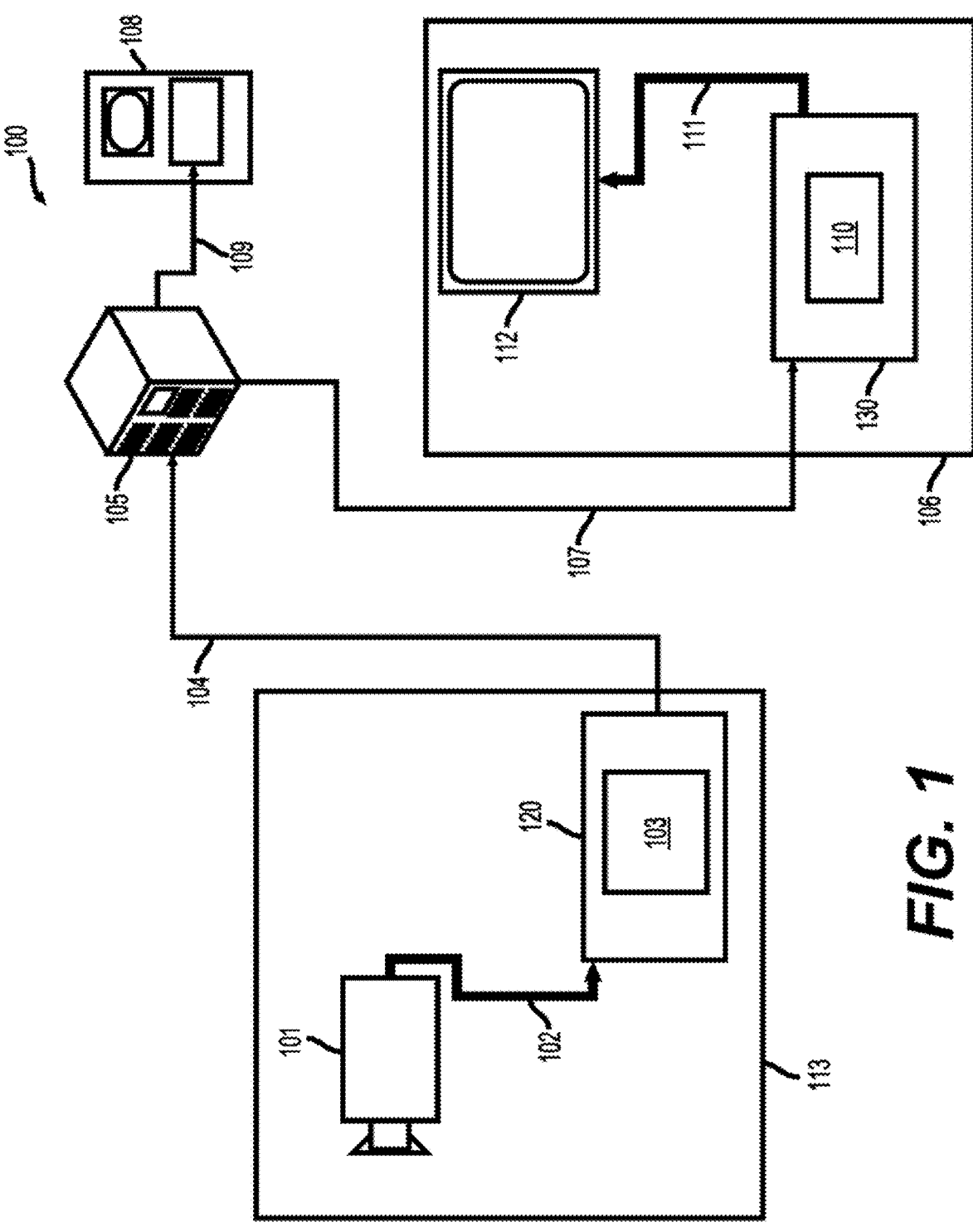
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101). The video source (101) may include one or more images captured by a camera and/or generated by a computer. For example, a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
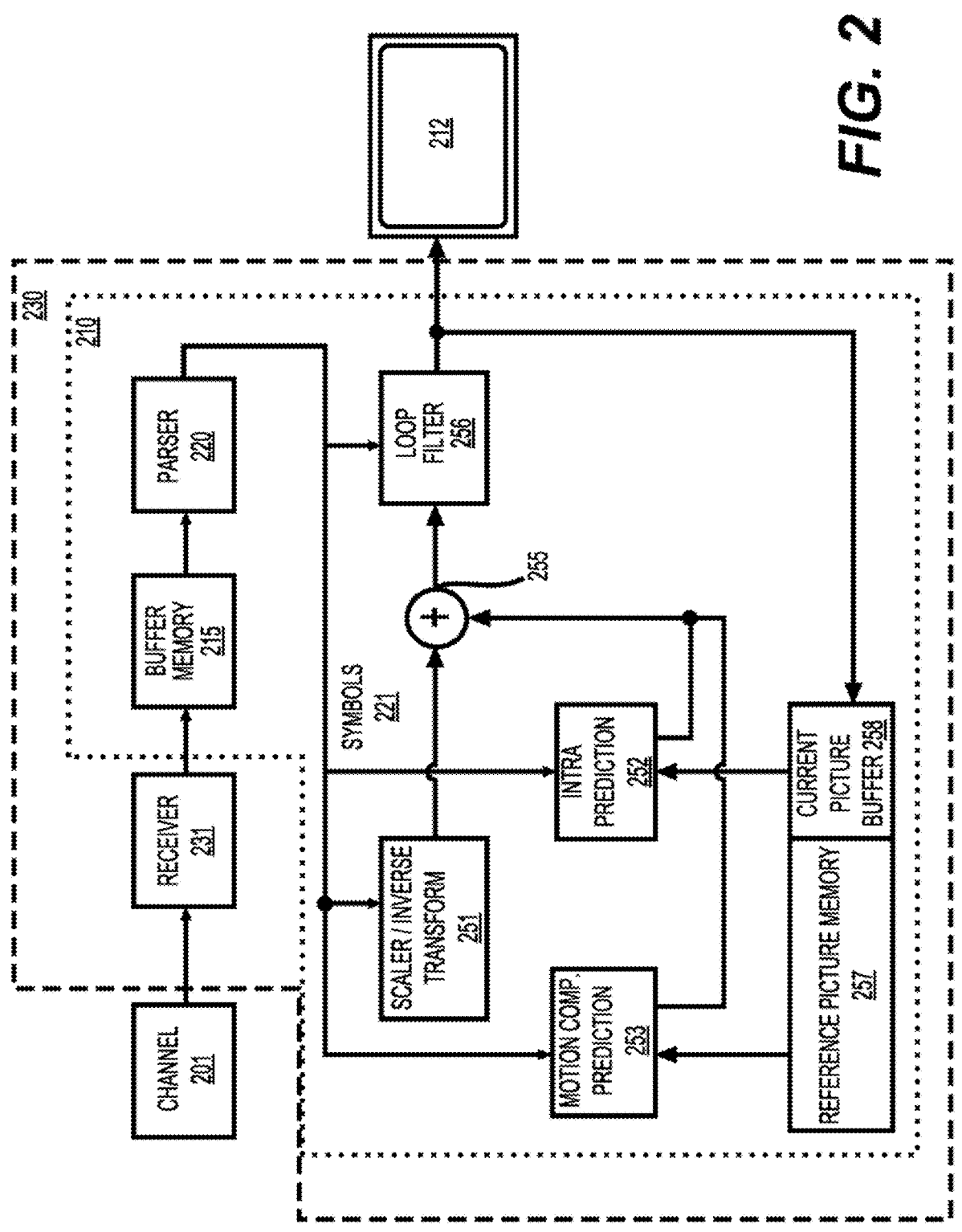
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
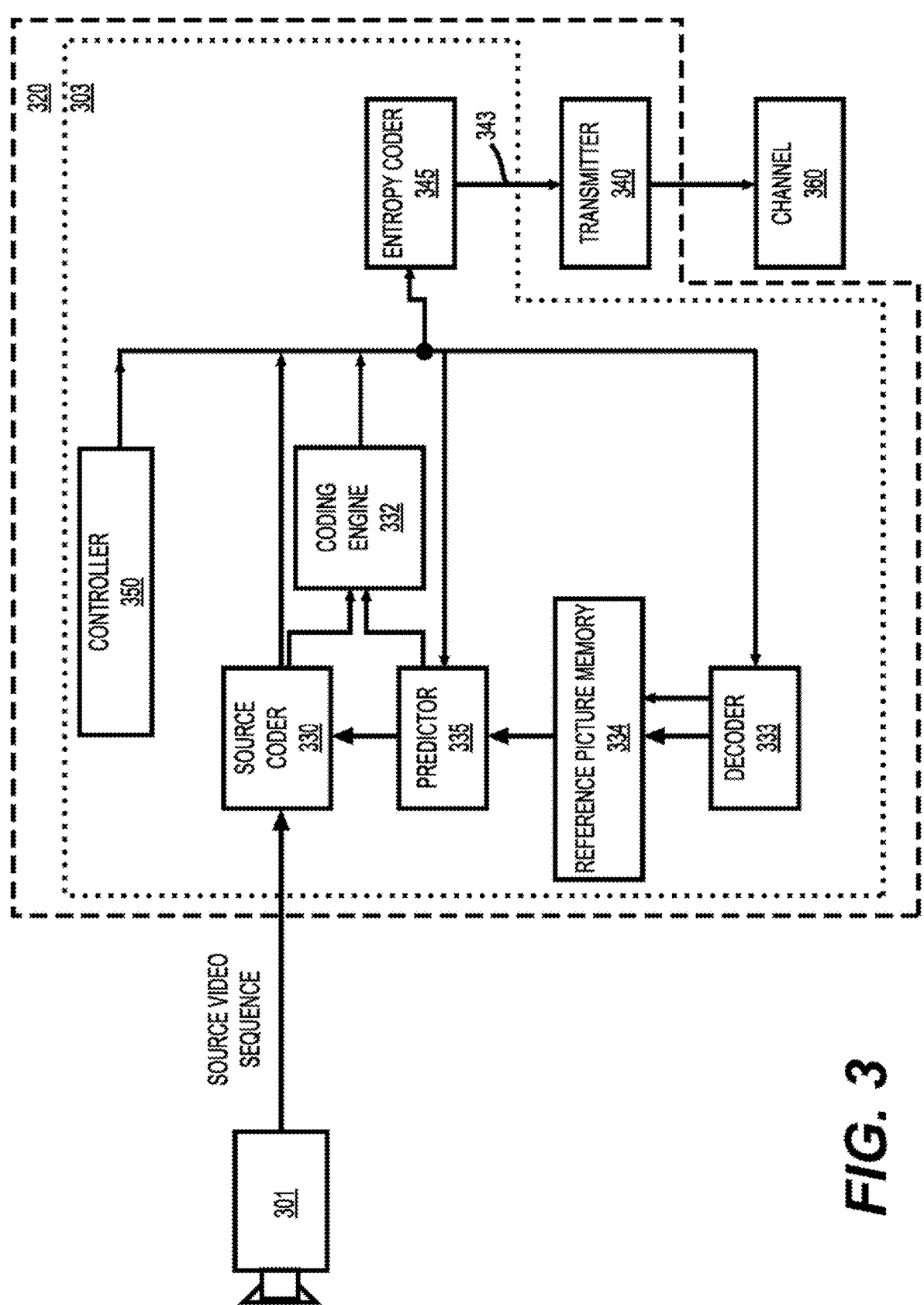
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture (or a mesh) to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

In an example, a mesh position quantization step size is defined based on a first parameter, such as mesh_position_quantization_step_size_log 2_denominator, and a second parameter, such as mesh_position_quantization_step_size_numerator_minus1. In an example, mesh_position_quantization_step_size_log 2_denominator is the log 2 of the denominator of the position quantization step size, with a value between 0 and 7, inclusively. In an example, mesh_position_quantization_step_size_numerator_minus1 plus 1 is the value of the numerator of the position quantization step size, with a value between 1 and 256, inclusively. After the position coding in MEB, the reconstructed position values used for reference are scaled to the dynamic range of the inter frames.

An example of mesh attributes encoding parameters syntax is shown as follows:

```
mesh_attribute_encoding_parameters( index ) {
Descriptor
    mesh_attribute_bit_depth_minus1[ index ]
u(4)
    if ( index == 0 ) { // Attribute type: Texture coordinate
        mesh_attribute_quantization_step_size_log2_denominator[ index ]
u(3)
        mesh_attribute_quantization_step_size_numerator[ index ]
u(8)
    }
    mesh_attribute_per_face_flag[ index ]
u(1)
    if( !mesh_attribute_per_face_flag[ index ] ) {
        mesh_attribute_separate_index_flag[ index ]
u(1)
        if( !mesh_attribute_separate_index_flag[ index ] )
            mesh_attribute_reference_index_plus1[ index ]
ue(v)
    }
    mesh_attribute_prediction_method[ index ]
ue(v)
```

-continued

```
mesh_attribute_residuals_encoding_method[ index ]
ue(v)
}
```

An example of mesh attributes encoding parameters semantics is defined by a parameter, such as mesh_attribute_quantization_step_size_log 2_denominator[i]. In an example, mesh_attribute_quantization_step_size_log 2_denominator[i] is the log 2 of the denominator of the i-th attribute quantization step size, with a value between 0 and 7, inclusively.

An example of general basemesh sequence parameter set RBSP syntax is shown as follows:

```
bmesh_sequence_parameter_set_rbsp( ) {
Descriptor
    bmsps_sequence_parameter_set_id
u(4)
    bmesh_profile_tier_level( )
    bmsps_intra_mesh_codec_id
u(8)
    bmsps_inter_mesh_codec_id
u(8)
    bmsps_inter_mesh_motion_group_size_minus1
u(8)
    bmsps_inter_mesh_max_num_neighbors_minus1
u(8)
    bmsps_geometry_3d_bit_depth_minus1
u(5)
    bmsps_inter_quantization_step_size_log2_denominator
u(3)
    bmsps_inter_quantization_step_size_numerator_minus1
u(8)
    bmsps_facegroup_segmentation_method
ue(v)
    bmsps_mesh_attribute_count
u(7)
    for( i = 0; i < bmsps_mesh_attribute_count; i++ ) {
        bmsps_mesh_attribute_type_id[ i ]
u(4)
        bmsps_attribute_bit_depth_minus1[ i ]
u(5)
        bmsps_attribute_msb_align_flag[ i ]
u(1)
    }
    bmsps_log2_max_mesh_frame_order_cnt_lsb_minus4
ue(v)
    bmsps_max_dec_mesh_frame_buffering_minus1
ue(v)
    bmsps_long_term_ref_mesh_frames_flag
u(1)
    bmsps_num_ref_mesh_frame_lists_in_bmsps
ue(v)
    for( i = 0; i < bmsps_num_ref_mesh_frame_lists_in_bmsps; i++ )
        bmesh_ref_list_struct( i )
    bmsps_extension_present_flag
u(1)
    if( bmsps_extension_present_flag ) {
        bmsps_extension_count_minus1
u(7)
    }
    if( bmsps_extension_present_flag ){
        bmsps_extensions_length_minus1
ue(v)
        while( more_rbsp_data( ) )
            bmsps_extension_data_byte
u(1)
    }
    rbsp_trailing_bits( )
}
```

An example of motion field quantization is defined by a first parameter, such as bmsps_inter_quantization_step_size_log 2_denominator, and a second parameter, such as bmsps_inter_quantization_step_size_numerator_minus1. In an example, bmsps_inter_quantization_step_size_log 2_denominator is the log 2 of the denominator of the motion field quantization step size, with a value between 0 and 7, inclusively. In an example, bmsps_inter_quantization_step_size_numerator_minus1 plus 1 is the value of the numerator of the motion field quantization step size, with a value between 1 and 256, inclusively. After motion field coding, the position values are reconstructed and would be used as references for future vertices. In an example, a mesh attribute quantization is defined by a step size parameter, such as mesh_attribute_quantization_step_size_numerator [i]. In an example, mesh_attribute_quantization_step_size_numerator[i] is the value of the numerator of the i-th attribute quantization step size, with a value between 0 and 255, inclusively. Meanwhile, the quantized prediction residue is de-quantized. A reconstructed value is calculated by adding the de-quantized prediction residue to the prediction value. The reconstructed value would be used as reference for future vertices.

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure includes techniques for base mesh coding in mesh compression.

A mesh may include several polygons that describe a surface of a volumetric object. Each polygon of the mesh may be defined by vertices of the corresponding polygon in a three-dimensional (3D) space and information of how the vertices are connected, which may be referred to as connectivity information. In some aspects, vertex attributes, such as colors, normals, and the like, may be associated with the vertices (or the mesh vertices). Attributes (or vertex attributes) may also be associated with the surface of the mesh by exploiting mapping information that parameterizes the mesh with two-dimensional (2D) attribute maps. Such mapping may be described by a set of parametric coordinates, referred to as UV coordinates or texture coordinates, associated with the mesh vertices. 2D attribute maps may be used to store high resolution attribute information such as texture, normals, displacements, and the like. The high-resolution attribute information may be used for various purposes such as texture mapping and shading.

A dynamic mesh sequence may require a large amount of data since the dynamic mesh may include a significant amount of information changing over time. Therefore, efficient compression technologies may be used to store and transmit such contents. Mesh compression standards, such as Information and Communication (IC) mesh compression, MESHGRID, and frame-based animated mesh compression (FAMC), were previously developed by Moving Picture Experts Group (MPEG) to address dynamic meshes with a constant connectivity, a time varying geometry, and vertex attributes. However, the standards may not consider time varying attribute maps and connectivity information. DCC (Digital Content Creation) tools may generate such dynamic meshes. However, it may be challenging for volumetric acquisition techniques to generate a constant connectivity dynamic mesh, especially under real time constraints. This type of content (e.g., a constant connectivity dynamic mesh) may not be supported by existing standards. The present disclosure includes aspects directed to new mesh compression standard that can directly handle dynamic meshes with time varying connectivity information and optionally time varying attribute maps. The mesh compression may target lossy and lossless compression for various applications, such as real-time communications, a storage, a free view-point video, Augmented Reality (AR), and Virtual Reality (VR). Functionalities, such as a random access and a scal-able/progressive coding, may also be considered.

Mesh geometry information may include vertex connec-tivity information, 3D coordinates, 2D texture coordinates, and/or the like. The 3D vertex coordinates and the 2D texture coordinates account for a significant portion of the mesh geometry information. Accordingly, compression of the 3D vertex coordinates (also referred to as vertex posi-tions) as well as 2D texture coordinates is needed to reduce the amount of data needed to store and/or transfer the mesh geometry information.

Figure 4:
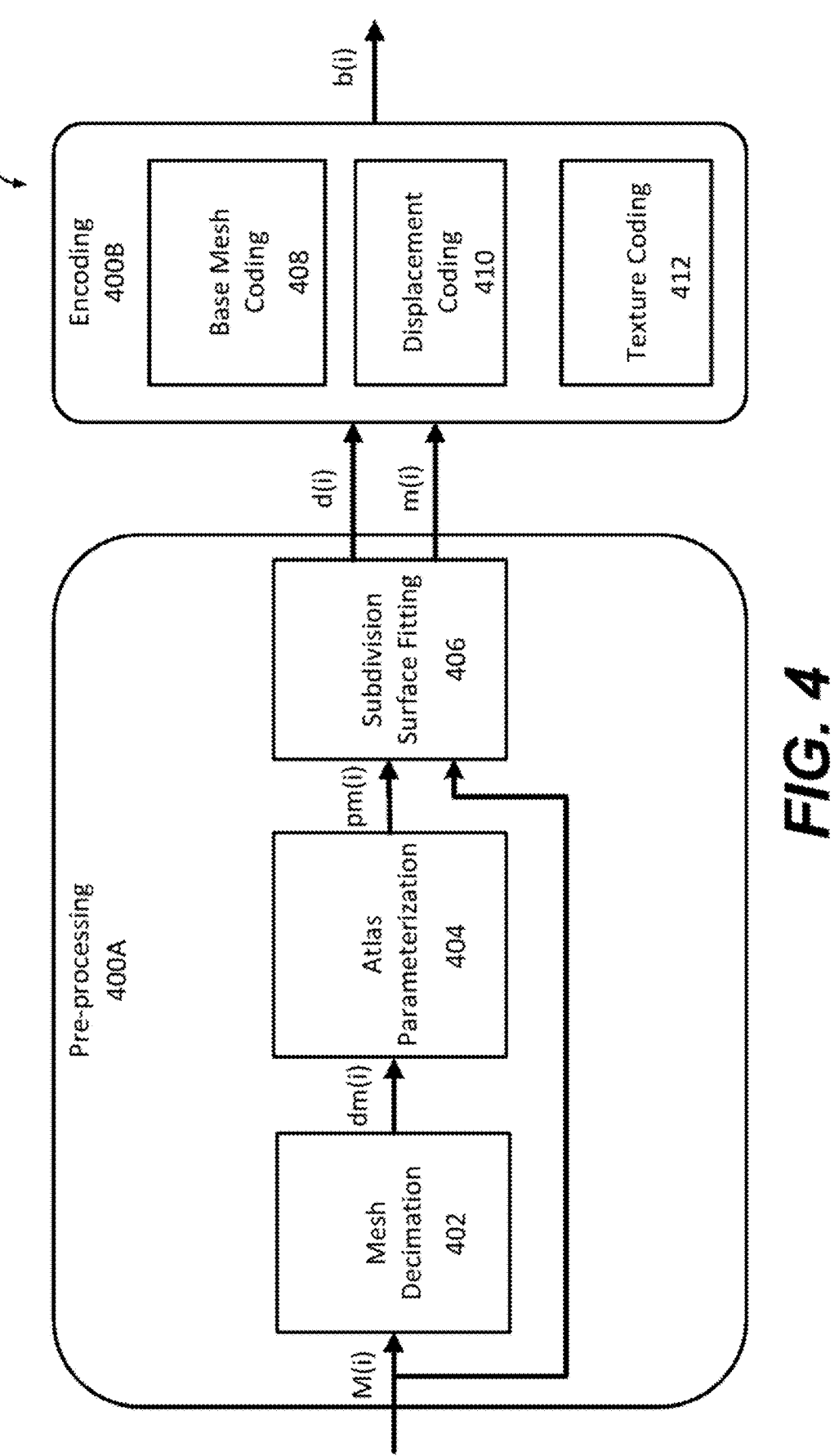
FIG. 4 is a schematic illustration of an example of an encoding process (400) for mesh processing according to an aspect of the disclosure.

FIG. 4 shows an example of an encoding process (400) for mesh processing based on a related video codec, such as MPEG V-Mesh™ v1.0, according to an aspect of the dis-closure. As shown in FIG. 4, the encoding process (400) may include a pre-processing step (400A) and an encoding step (400B). The pre-processing step (400A) may be configured to generate a base mesh m(i) of a current frame and a displacement field d(i) of the current frame that includes displacement vectors according to an input mesh M(i) of the current frame. The encoding step (400B) may be configured to encode the base mesh m(i), the displacement field d(i), and texture information of the base mesh m(i). The displace-ment field d(i) of the current frame may include displace-ment vectors. An index i may refer to the current frame. In an aspect, a mode decision method may be performed in the encoding process (400) to determine whether inter coding (also referred to as inter frame prediction or an inter mode), intra coding (also referred to as intra frame prediction or an intra mode), or the like is applied to the current frame. For example, the mode decision method may compare a cost of an intra mode and a cost of an inter mode and decide a coding mode of the base mesh m(i) of the current frame based on which one of the costs is smaller. In some examples, a skip mode is used to code (e.g., encode or decode) the base mesh m(i). In an example, the skip mode is a special mode of the inter mode. For example, the base mesh m(i) may be intra coded, or inter coded, or coded with the SKIP mode.

Still referring to FIG. 4, the pre-processing step (400A) may include a mesh decimation process (402), a parameter-ization process such as an atlas parameterization process (404), and a subdivision surface fitting process (406). The mesh decimation process (402) is configured to down-sample vertices of the input mesh M(i) to generate a deci-mated mesh dm(i) that may include a plurality of decimated (or down-sampled) vertices. A number of the plurality of decimated vertices is less than a number of the vertices of the input mesh M(i). The parameterization process such as the atlas parameterization process (404) is configured to map the decimated mesh dm(i) onto a planar domain, such as onto a UV atlas (or a UV map), to generate a re-parameter-ized mesh pm(i). In an example, the atlas parameterization may be performed based on a video processing tool, such as a UVAtlas tool. The subdivision surface fitting process (406) is configured to take the re-parameterized mesh pm(i) and the input mesh M(i) as inputs and produce a based mesh m(i) together with the displacement field d(i) that includes displacement vectors or a set of displacements. In an example of the subdivision surface fitting process (406), pm(i) is subdivided by using a subdivision scheme such as an iterative interpolation to obtain a subdivided mesh. The iterative interpolation includes inserting at each iteration a new point in a middle of each edge of the re-parameterized mesh pm(i). Any suitable subdivision scheme may be applied to subdivide pm(i). The displacement field d(i) is computed by determining a nearest point on a surface of the input mesh M(i) for each vertex of the subdivided mesh.

An advantage of the subdivided mesh may include that the subdivided mesh has a subdivision structure that allows efficient compression, while offering a faithful approxima-tion of the input mesh. An increase in compression efficiency may be obtained due to the following properties. The decimated mesh dm(i) may have a low number of vertices and may be encoded and transmitted using a lower number of bits than the input mesh M(i) or the subdivided mesh. Referring to FIG. 4, the base mesh m(i) may be generated from the decimated mesh dm(i). In an example, the base mesh m(i) is the decimated mesh dm(i). As the subdivided mesh may be generated based on the subdivision method, the subdivided mesh may be automatically generated by the decoder when the base mesh or the decimated mesh is decoded (e.g., there is no need to use any information other than the subdivision scheme and a subdivision iteration count). At the decoder side, the displacement field d(i) may be generated by decoding the displacement vectors associ-ated with the vertices of the subdivided mesh. Besides allowing for spatial/quality scalability, the subdivision struc-ture enables efficient transforms such as wavelet decompo-sition, which can offer high compression performance.

For the purposes of brevity, the pre-processing step (400A) that may be applied to an input mesh such as a 3D mesh may be illustrated using a pre-processing step (500) that is applied to a two-dimensional (2D) curve. The pre-processing step (400A) and the pre-processing step (500) are similar except that a 3D mesh may be replaced by a 2D curve.

Figure 5:
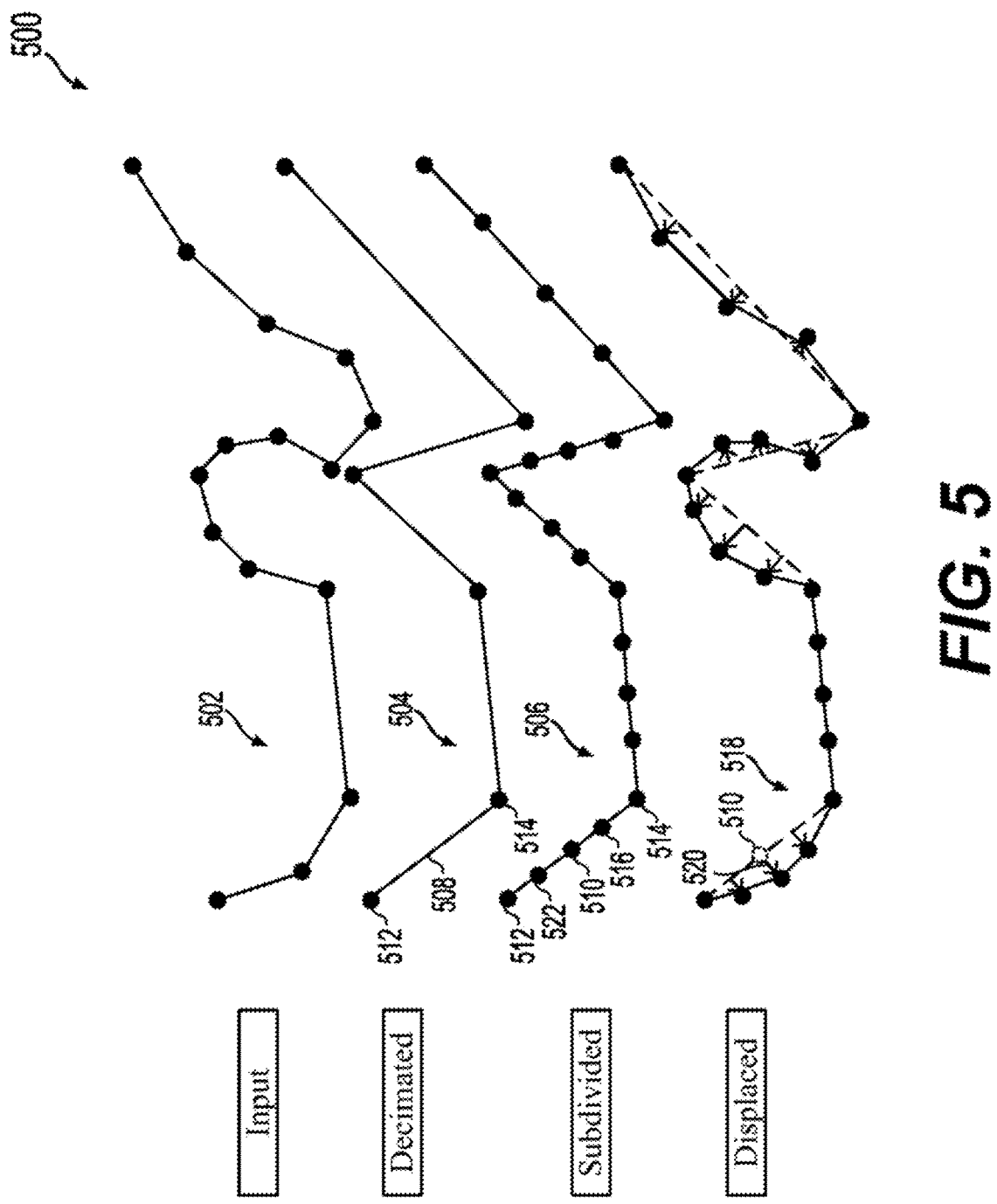
FIG. 5 is a schematic illustration of an example of pre-processing step (500) according to an aspect of the disclosure.

FIG. 5 shows an example of the pre-processing step (500) according to an aspect of the disclosure. As shown in FIG. 5, an input 2D curve (represented by a 2D polyline) (502) may be down-sampled to generate a base curve such as a polyline, referred to as "decimated" curve (504). A subdi-vision scheme may then be applied to the decimated polyline (504) to generate a "subdivided" curve (506). In an example, the subdivision scheme may be an iterative interpolation scheme. The iterative interpolation scheme may include inserting at each iteration a new point in a middle of each edge of the polyline (or decimated curve) (504). For example, a point (510) may be inserted in the edge (508) of the decimated curve (504). In an example, the edge (508) is between points (512) and (514). Further, a point (522) may be added between the point (512) and the point (510), and a point (516) may be added between the point (510) and the point (514). The subdivided polyline (506) is then deformed to generate a displaced curve (518). The displaced curve (518) may be a better approximation of the input curve (502) than the subdivided curve (506). For example, a displace-ment vector (e.g., (520)) is computed for each vertex (e.g., (510)) of the subdivided curve (506) such that a shape of the displaced curve (518) is as close as possible to a shape of the input curve (502). An advantage of the subdivided curve (506) is that the subdivided curve (506) has a subdivision structure that allows for more efficient compression, while offering a faithful approximation of the input curve (502).

The decimated curve (504) may have a lower number of points and may be encoded and transmitted using a limited number of bits. As the subdivided curve may be generated based on the subdivision scheme, the subdivided curve may be automatically generated by the decoder when the base curve or the decimated curve is decoded (e.g., there is no need to use any information other than the subdivision method and a subdivision iteration count). The displaced curve is generated by decoding the displacement vectors associated with the subdivided curve vertices. Besides allowing for spatial/quality scalability, the subdivision structure enables efficient transforms such as wavelet decomposition, which can offer high compression performance.

Still referring to FIG. 5, in an example, an input mesh M(i) may include the input 2D curve (502). A base mesh m(i) may include the decimated curve (504) that is formed via down-sampled vertices of the input 2D curve (502). A displacement field dm(i) may include a plurality of displacement vectors, such as the displacement vector (520) shown in FIG. 5.

The encoding step (400B) may include a base mesh coding (408), a displacement coding (410), a texture coding (412), and the like. The base mesh coding (408) is configured to encode geometric information of the base mesh m(i) associated with the current frame. In an intra encoding, the base mesh m(i) may be first quantized (e.g., using uniform quantization) and then encoded, for example, by the coding mode determined using the mode decision method. The coding mode may be the inter mode, the intra mode, the skip mode, or the like. The encoder used to intra code the base mesh m(i) may be referred to as a static mesh encoder. In the inter encoding, a reference base mesh (e.g., a reconstructed quantized reference base mesh m'(j)) associated with a reference frame indicated by an index j may be used to predict the base mesh m(i) associated with the current frame indicated by the index i. The displacement coding (410) is configured to encode the displacement field d(i) that is generated in the pre-processing step (400A). The displacement field d(i) may include a set of displacement vectors (or displacements) associated with the subdivided mesh vertices. The texture coding (412) is configured to encode attribute information of the base mesh m(i). The attribute information may include texture, normal, color, and/or the like. The attribute information may be encoded based on a suitable codec, such as High-Efficiency Video Coding (HEVC) or Versatile Video Coding (VVC).

In an aspect, referring to FIG. 4, a mesh encoding process such as the encoding process (400) starts with a pre-processing (e.g., the pre-processing step (400A)). The pre-processing may convert the input mesh (e.g., the input dynamic mesh) M(i) into the base mesh m(i) together with the displacement field d(i) including a set of displacements (or a set of displacement vectors). The encoding step (400B) may compress outputs (e.g., m(i), d(i), and the like) from the pre-processing and generate a compressed bitstream b(i). The compressed bitstream b(i) may include a compressed base mesh bitstream, a compressed displacement field bitstream, a compressed attribute bitstream, and/or the like.

Figure 6:
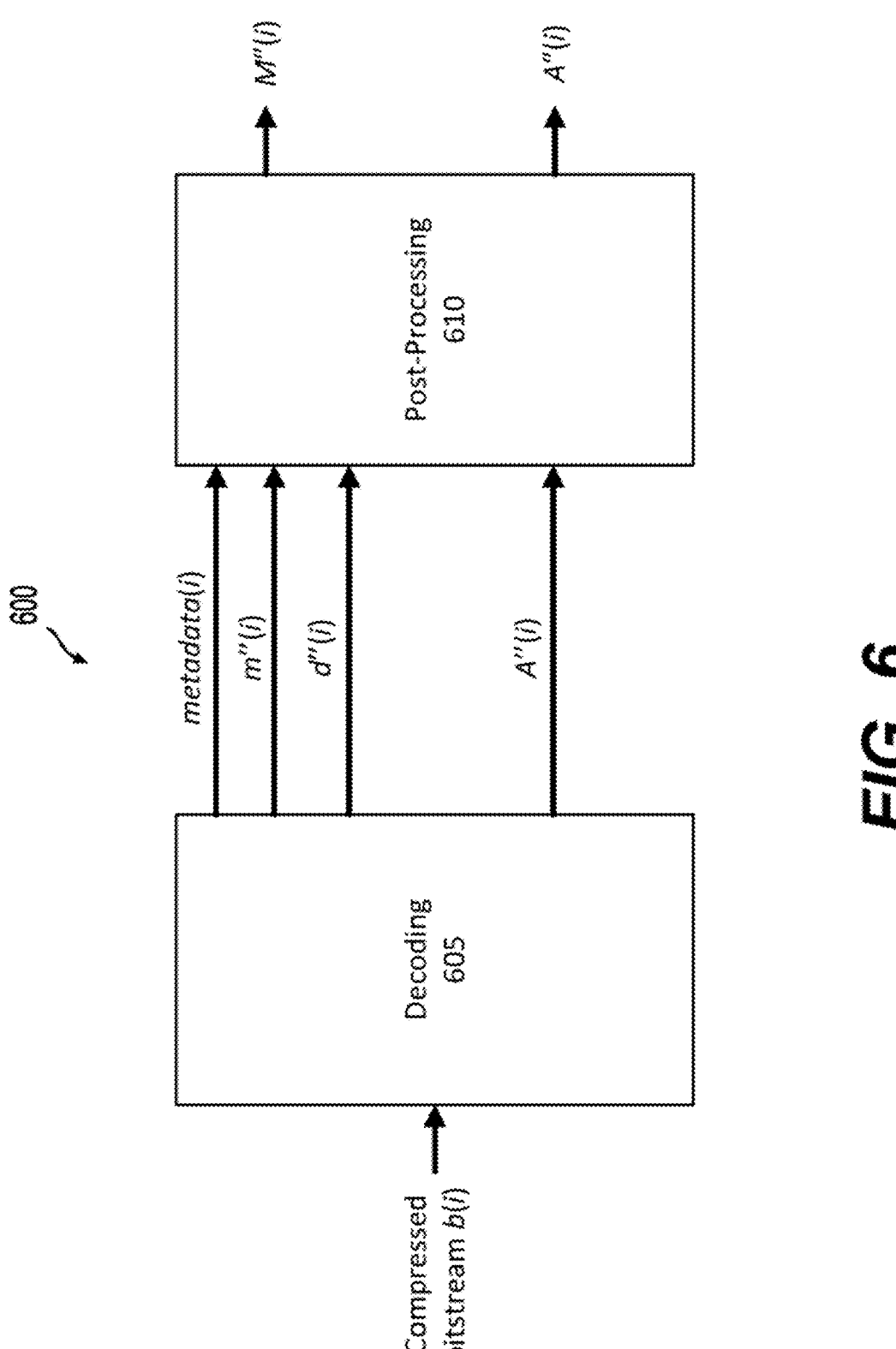
FIG. 6 is a schematic illustration of a decoding process (600) for mesh processing according to an aspect of the disclosure.

FIG. 6 shows an example of a decoding process (600) for mesh processing according to an aspect of the disclosure. The decoding process (600) may include a decoding step (605) and a post-processing step (610). A compressed bitstream b(i) may be fed to the decoding step (605). In an example, such as for a lossless transmission, the compressed bitstream b(i) is the output b(i) from the encoding process (400). The decoding step (605) may extract various sub-bitstreams such as the compressed base mesh sub-stream, the compressed displacement field sub-stream, the compressed attribute sub-stream, and/or the like. The decoding step (605) may decompress the sub-bitstreams to generate the following components: patch metadata indicated by metadata(i), a decoded base mesh m"(i), a decoded displacement field (including displacements) d"(i), a decoded attribute map A"(i), and/or the like.

In an aspect, the base mesh sub-stream may be fed to a mesh decoder to generate a reconstructed quantized base mesh m'(i). The decoded base mesh (or reconstructed base mesh) m"(i) may be obtained by applying an inverse quantization to m'(i). The displacement field sub-stream including packed and quantized wavelet coefficients that are encoded may be decoded by a video and/or image decoder. Image unpacking and inverse quantization may be applied to the packed quantized wavelet coefficients that are reconstructed to obtain the unpacked and unquantized transformed coefficients (e.g., wavelet coefficients). An inverse wavelet transform may be applied to the unpacked and unquantized wavelet coefficients to generate the decoded displacement field (or reconstructed displacement) d"(i).

The decoded components (e.g., including metadata(i), m"(i), d"(i), A"(i), and/or the like) may be fed to a post-processing step (610). A mesh (also referred to as a decoded/reconstructed mesh) M"(i) may be generated by the post-processing step (610) based on m"(i) and d"(i). In an example, the mesh M"(i) (also referred to as a reconstructed deformed mesh DM(i)) may be obtained by subdividing m"(i) using a subdivision scheme and applying the reconstructed displacements d"(i) to vertices of a subdivided mesh. In an example, the DM (i) may include the displaced curve (518). In an example, when the encoding process (400), the decoding process (600), and the transmission are lossless, the mesh M"(i) may be identical to the input mesh M(i). When one of the encoding process (400), the decoding process (600), and the transmission is lossy, M"(i) is different from M(i). In various examples, the difference, if any, between M"(i) and M(i) may be relatively small. In an example, an attribute map A"(i) is also generated by the post-processing step (610).

In an aspect, a base mesh may be intra coded, inter coded, or coded with a SKIP mode, or the like. In an example, the SKIP mode may be a special mode of the inter mode where a base mesh m(i) of a current frame indicated by an index i is the same as a base mesh m(j) of a reference frame indicated by an index (also referred to as a frame index) j. When the inter mode is applied to code the base mesh in the current frame, the encoder may generate a predicted base mesh of the current frame based on the reconstructed base mesh of the reference frame. In an example, such as in MPEG V-DMC WD 2.0, the reference frame is the frame immediately before the current frame in a display order. The frame index i of the current frame indicates the display order. When the frame index of the current frame is i, the frame index of the reference frame is (i−1). In an example, the current frame and the reference frame are in the same group of frames (GoF).

In an aspect, a mesh encoding process, such as in MPEG V-DMC WD 2.0, starts with a pre-processing. The pre-processing may convert an input dynamic mesh, denoted M(i), into a base mesh m(i) together with a set of displacements d(i). An encoder may compress the base mesh m(i) and the displacements d(i) to generate a compressed bitstream b(i).

As shown in FIG. 4, the pre-processing may include mesh decimation, atlas parameterization, and subdivision surface fitting. The mesh decimation may use a simplification technique to decimate the input mesh M(i) and produce a decimated mesh dm(i). The decimated mesh dm(i) may be re-parameterized. The generated mesh may be denoted as pm(i). The subdivision surface fitting may take the re-parameterized mesh pm(i) and the input mesh M(i) as input to produce the base mesh m(i) together with the set of displacements d(i).

In the disclosure, methods and systems are provided for base mesh coding in mesh compression. In an aspect, the base mesh coding includes position coding and 2D texture coordinate coding. In an example, such as in MPEG V-DMC WD 2.0, the position coding and the 2D texture coordinate coding utilize a workflow that includes a bitdepth quantization, a prediction, and an entropy coding. An example of a workflow (700) is shown in FIG. 7.

Figure 7:
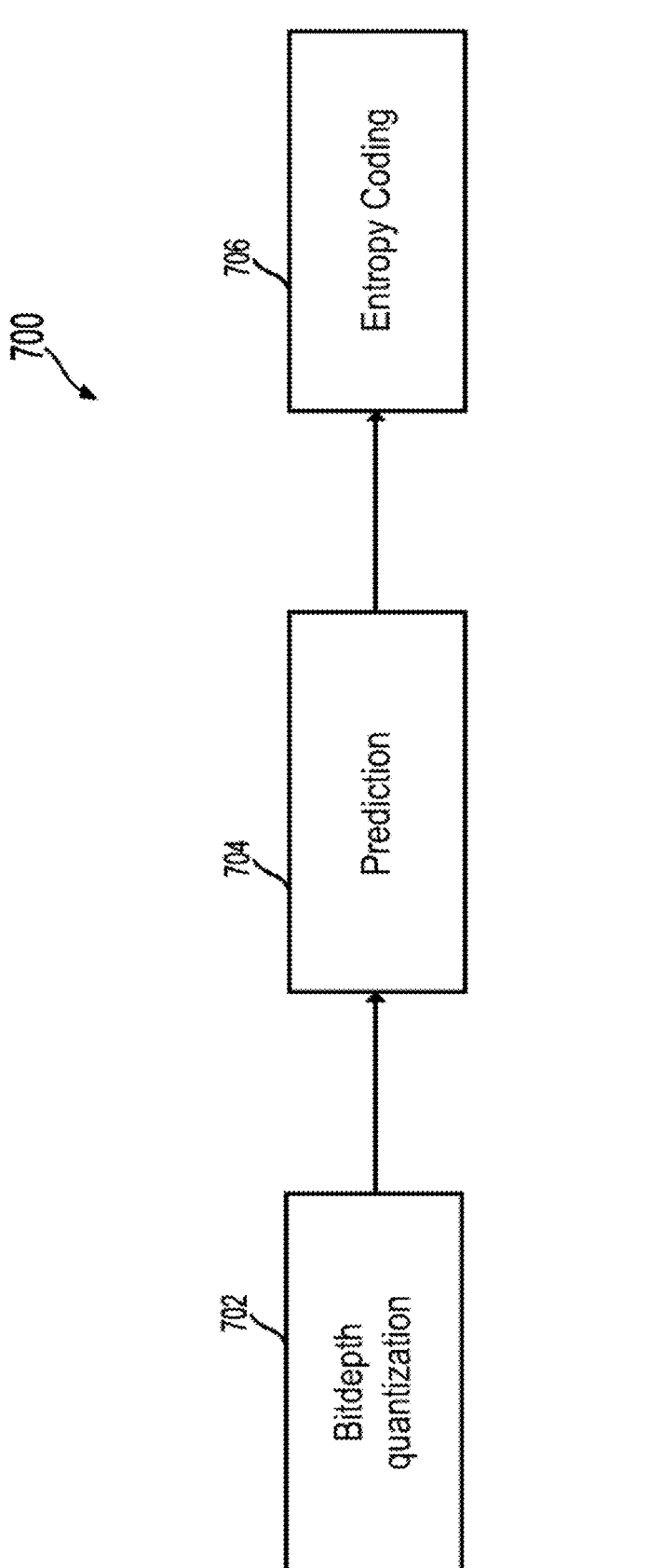
FIG. 7 is a schematic illustration of an example of base mesh coding according to an aspect of the disclosure.

As shown in FIG. 7, the workflow (700) includes a bitdepth quantization (702), a prediction (704), and an entropy coding (706). In the bitdepth quantization (702), a position (or position coordinate) and a 2D texture coordinate of a vertex in a base mesh is quantized to bitdepth values. The bitdepth values may be specified (or defined) by an encoder. The base mesh may include a subset of a plurality of vertices of a mesh. In an aspect, if the bitdepth value for the position is n and the bitdepth value for the 2D texture coordinate is m, the position is quantized to an integer between 0 and $2^n-1$, and the 2D texture coordinate is quantized to an integer between 0 and $2^m-1$, respectively, where the n and m are positive integers. For example, if the bitdepth value for the position is 12 and the bitdepth value for the 2D texture coordinate is 13, then the position is quantized to an integer between 0 and 4095, and the 2D texture coordinate is quantized to an integer between 0 and 8191, respectively. The quantized value may be predicted at the prediction (704) by a prediction mode or a prediction algorithm, such as by a multi-parallelogram algorithm for the position of the vertex and a stretch prediction algorithm for the 2D texture coordinate. A prediction residue of the position and a prediction residue of the 2D texture coordinate of the vertex may further be compressed by the entropy coding (706).

In an aspect, such as in MPEG V-DMC WD 2.0, bitdepth values for quantization are limited or constrained. In the present disclosure, base mesh coding with fine granularity of quantization is provided. In an aspect, the based mesh coding with fine granularity of quantization is provided with a joint quantization. In the joint quantization, a quantization of a position of a vertex and a quantization of a 2D texture coordinate of the vertex may depend on one another.

Figure 8:
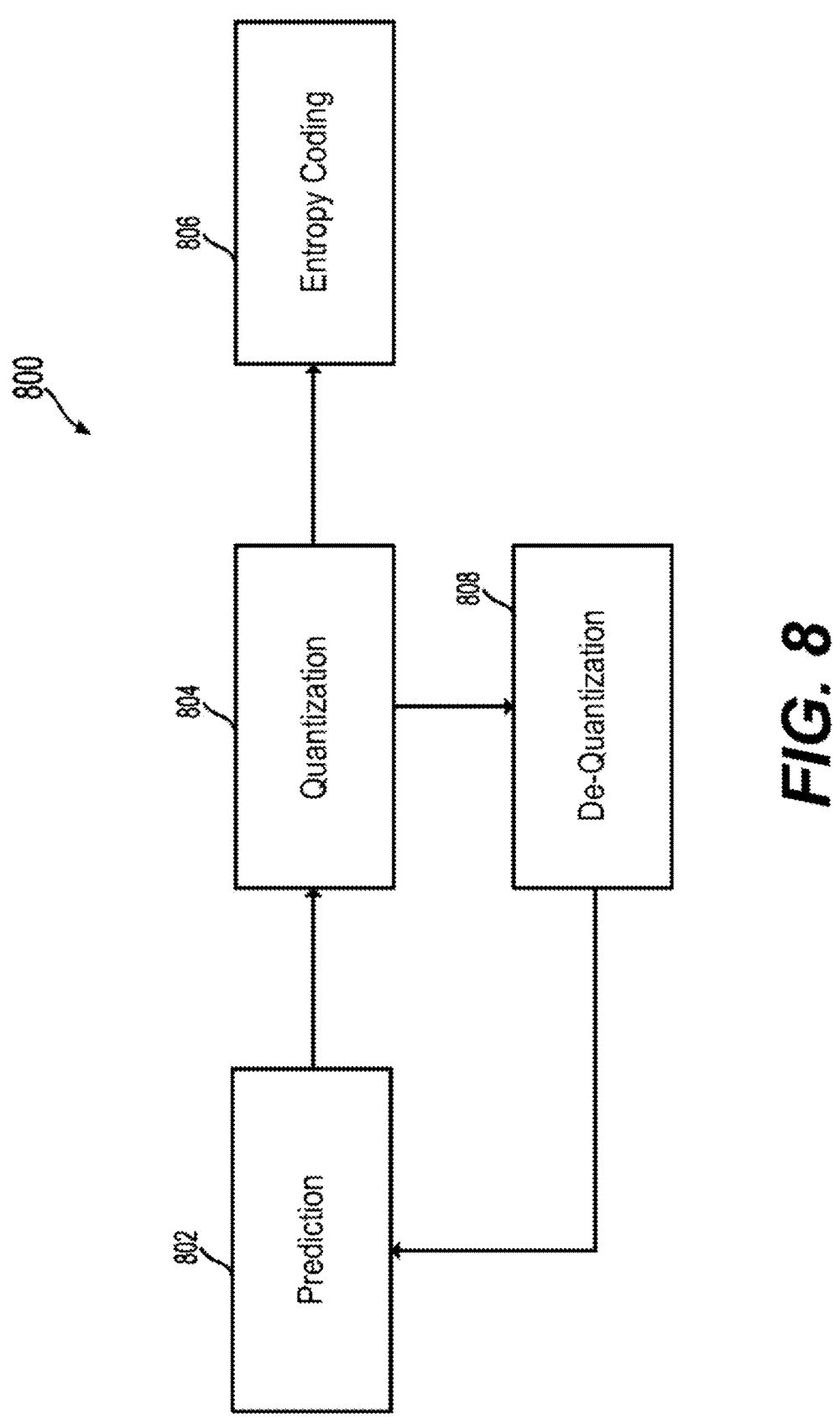
FIG. 8 is a schematic illustration of an example of base mesh coding with a fine granularity of quantization according to an aspect of the disclosure.

In the disclosure, a base mesh coding with fine granularity of quantization is provided. The base mesh coding may include a prediction, a quantization, a de-quantization, and an entropy coding. An example of a base mesh coding (800) is shown in FIG. 8. As shown in FIG. 8, the base mesh coding (800) includes a prediction (802), a quantization (804), a de-quantization (808), and an entropy coding (806). In an example, the base mesh coding (800) may also include a bitdepth quantization (not shown) prior to the prediction (802). The bitdepth quantization may be configured to quantize a position and a 2D texture coordinate of a vertex of a base mesh into bitdepth values. At the prediction (802), when the base mesh coding (800) includes the bitdepth quantization, bitdepth values generated at the bitdepth quantization are predicted based on algorithms or prediction modes, such as a multi-parallelogram algorithm for the position of the vertex and a stretch prediction algorithm for the 2D texture coordinate. When the base mesh coding (800) does not include the bitdepth quantization, the position and the 2D texture coordinate of the vertex in the base mesh may be predicted based on suitable prediction modes or algorithms. Accordingly, a position prediction, a 2D texture coordinate prediction, a position prediction residue of the position prediction, and a 2D texture coordinate prediction residue of the 2D texture coordinate prediction of the vertex may be generated at the prediction (802). The position prediction residue for the position prediction and the 2D texture coordinate prediction residue for the 2D texture coordinate prediction of the vertex may further be quantized at the quantization (804). The quantization (804) is configured to reduce precision of the prediction residues according to a quantization parameter (QP), such as a quantization step value. Thus, less important information is discarded, and significant compression is achieved through the quantization (804). The quantized prediction residues are further compressed by the entropy coding (806).

Still referring to FIG. 8, the quantized prediction residues obtained at the quantization (804) may be provided to the de-quantization (808). The de-quantization (808) may dequantize the quantized prediction residues to obtain the prediction residues that were generated at the prediction (802). The prediction residues may further be provided to the prediction (802). The position and the 2D texture coordinate of the vertex may be reconstructed based on the predictions and the prediction residues. The reconstructed position and the 2D texture coordinate of the vertex may function as reference information for a subsequent vertex.

In an aspect, a position of a current vertex in a mesh (or base mesh) is predicted by positions of already coded vertices according to suitable prediction modes or prediction algorithms, such as a multi-parallelogram prediction or a position algorithm. A 2D texture coordinate of the current vertex is predicted by 2D texture coordinates of the already coded vertices according to suitable prediction modes or prediction algorithms, such as a stretch prediction algorithm or a 2D texture coordinate prediction algorithm. In an example, the position and the 2D texture coordinate of the current vertex are predicted via a prediction process, such as the prediction (802) in FIG. 8.

In an aspect, a prediction residue, which is a difference between a true value (or initial value) and a predicted value, is quantized by a quantization parameter, such as a quantization step value. The quantized step value may be a positive integer, a positive rational number, or a positive real number. In an example, a prediction residue of a position of a current vertex is a difference between a true value (or initial value) of the position and a prediction value of the position. In an example, a prediction residue of a 2D texture coordinate of the current vertex is a difference between a true value (or initial value) of the 2D texture coordinate of the current vertex and a prediction value of the 2D texture coordinate of the current vertex. In an example, the prediction residues of the position and the 2D texture coordinate of the current vertex are quantized via a quantization process, such as the quantization (804) in FIG. 8.

In an aspect, a quantized prediction residue is compressed by an entropy coding. The entropy coding may include a fixed length coding, a variable length coding, a Huffman coding, an arithmetic coding, or the like. In an example, the quantized prediction residues of the position and the 2D texture coordinate of the current vertex are entropy coded via an entropy coding process, such as the entropy coding (806) in FIG. 8.

In an aspect, a quantized prediction residue of a current vertex is de-quantized. A reconstructed value is calculated by adding the de-quantized prediction residue to a prediction value. The reconstructed value may be used as a reference value for future vertices, such as vertices subsequent to the current vertex according to a coding order. In an example, a quantized prediction residue of a position of a current vertex is de-quantized to obtain a position prediction residue. A reconstructed position of the current vertex is calculated by adding the position prediction residue and a prediction value of the position of the current vertex. In an example, the quantized prediction residues of the position and the 2D texture coordinate of the current vertex are de-quantized via a de-quantization process, such as the de-quantization (808) in FIG. 8.

In the disclosure, a joint quantization is provided. In the joint quantization, a quantization of a position of a vertex and a quantization of a 2D texture coordinate of the vertex may depend on one another. For example, a quantization parameter of the quantization of the position of the vertex and a quantization parameter of the quantization of the 2D texture coordinate of the vertex may depend on each other. In an example, the quantization of the position of the vertex depends on the quantization of the 2D texture coordinate. In an example, the quantization of the 2D texture coordinate depends on the quantization of the position of the vertex.

In an aspect, a quantization parameter, such as a quantization step value, of a 2D texture coordinate of a vertex is determined by a quantization process of a position of the vertex.

In an aspect, a quantization step value of a 2D texture coordinate of a vertex is dependent on a quantization step value of a position of the vertex. For example, the quantization step value of the 2D texture coordinate of the vertex is equal to the quantization step value of the position of the vertex.

In an aspect, a quantization step value of a 2D texture coordinate of a vertex is dependent on a multiple of a quantization step value of a position of the vertex. For example, the quantization step value of the 2D texture coordinate of the vertex is equal to the multiple of the quantization step value of the position of the vertex. The multiple may be a position integer, a positive rational number, or a positive real number.

In an aspect, a quantization step value of a 2D texture coordinate of a vertex is dependent on a function (e.g., a linear function or a non-linear function) of a quantization step value of a position of the vertex. In an example, the quantization step value of the position is an input of the function. The quantization step value of the 2D texture coordinate of the vertex is equal to an output of the function of the quantization step value of the position of the vertex.

An example of the linear function is $f(x)=ax+b$, where a is a non-negative real number, b is a real number, x is the quantization step value of the position of the vertex, and $f(x)$ is an output of the linear function and equal to the quantization step value of the 2D texture coordinate of the vertex.

In an aspect, a quantization step value of a 2D texture coordinate of a vertex is dependent on a monotonically non-decreasing function of a quantization step value of a position of the vertex. In an example, the quantization step value of the position is an input of the monotonically non-decreasing function. The quantization step value of the 2D texture coordinate of the vertex is equal to an output of the monotonically non-decreasing function of the quantization step value of the position of the vertex.

Examples of the monotonically non-decreasing function include $f(x)=x$, $f(x)=e^x$, and $f(x)=x^n$, where n is a positive integer.

In an aspect, a quantization step value of a 2D texture coordinate of a vertex is dependent on a monotonically non-decreasing function of a quantization error of a position of the vertex. A quantization error may be a difference between an un-quantized value (e.g., un-quantized predication residue of the position of the vertex) and a quantized value (e.g., quantized prediction residue of the position of the vertex).

In an example, the quantization error of the position of the vertex is an input of the monotonically non-decreasing function. The quantization step value of the 2D texture coordinate of the vertex is equal to an output of the monotonically non-decreasing function of the quantization error of the position of the vertex.

In the disclosure, a quantization step value of a position of a vertex is determined by a quantization process of a 2D texture coordinate of the vertex.

In an aspect, a quantization step value of a position of a vertex is dependent on a quantization step value of a 2D texture coordinate of the vertex. In an example, the quantization step value of the position of the vertex is equal to the quantization step value of the 2D texture coordinate of the vertex.

In an aspect, a quantization step value of a position of a vertex is dependent on a multiple of a quantization step value of a 2D texture coordinate of the vertex, where the multiple may be a position integer, a positive rational number, or a position real number. In an example, the quantization step value of the position of the vertex is equal to the multiple of the quantization step value of the 2D texture coordinate of the vertex.

In an aspect, a quantization step value of a position of a vertex is dependent on a function (e.g., a linear function or non-linear function) of a quantization step value of a 2D texture coordinate of the vertex. In an example, the quantization step value of the 2D texture coordinate is an input of the function. The quantization step value of the position of the vertex is equal to an output of the function of the quantization step value of the 2D texture coordinate of the vertex.

An example of the linear function is $f(x)=ax+b$, where a is a non-negative real number, b is a real number, x is the quantization step value of the 2D texture coordinate of the vertex, and $f(x)$ is the quantization step value of the position of the vertex.

In an aspect, a quantization step value of a position of a vertex is dependent on a monotonically non-decreasing function of a quantization step value of a 2D texture coordinate of the vertex. In an example, the quantization step value of the 2D texture coordinate of the vertex is an input of the monotonically non-decreasing function. The quantization step value of the position of the vertex is equal to an output of the monotonically non-decreasing function of the quantization step value of the 2D texture coordinate of the vertex.

In an aspect, a quantization step value of a position of a vertex is dependent on a monotonically non-decreasing function of a quantization error of a 2D texture coordinate of the vertex. A quantization error may be a difference between an un-quantized value (e.g., un-quantized predication residue of the 2D texture coordinate of the vertex) and a quantized value (e.g., quantized prediction residue of the 2D texture coordinate of the vertex). In an example, the quantization error of the 2D texture coordinate of the vertex is an input of the monotonically non-decreasing function. The quantization step value of the position of the vertex is equal to an output of the monotonically non-decreasing function of the quantization error of the 2D texture coordinate of the vertex.

FIG. 9 shows a flow chart outlining a process (900) according to an aspect of the disclosure. The process (900) can be used in a video decoder. In various aspects, the process (900) is executed by processing circuitry, such as the processing circuitry that performs functions of the video decoder (110), the processing circuitry that performs functions of the video decoder (210), and the like. In some aspects, the process (900) is implemented in software instructions, thus when the processing circuitry executes the software instructions, the processing circuitry performs the process (900). The process starts at (S901) and proceeds to (S910).

At (S910), a bitstream that includes base mesh information of a base mesh is received. The base mesh includes a subset of a plurality of vertices of a mesh in a current mesh frame.

At (S920), a position prediction of a current vertex of the base mesh and an attribute prediction of the current vertex are determined.

At (S930), a position prediction residue for the position prediction of the current vertex and an attribute prediction residue for the attribute prediction of the current vertex of the base mesh are determined.

At (S940), a position of the current vertex of the base mesh is reconstructed based on the position prediction and the position prediction residue. An attribute of the current vertex of the base mesh is reconstructed based on the attribute prediction and the attribute prediction residue.

In an example, the attribute of the current vertex is a two-dimensional (2D) texture coordinate of the current vertex. The attribute prediction is a 2D texture coordinate prediction. The attribute prediction residue is a 2D texture coordinate prediction residue.

In an example, the position prediction of the current vertex is determined based on one or more coded vertices according to a multi-parallelogram prediction. The 2D texture coordinate prediction of the current vertex is determined based on the one or more coded vertices according to a stretch prediction algorithm.

In an example, a quantized position prediction residue for the position prediction of the current vertex is determined based on a first entropy coding. The quantized position prediction residue for the position prediction of the current vertex is dequantized to determine the position prediction residue based on a first quantization step value. A quantized 2D texture coordinate prediction residue for the 2D texture coordinate prediction for the current vertex is determined based on a second entropy coding. The quantized 2D texture coordinate prediction residue for the 2D texture coordinate prediction of the current vertex is dequantized to determine the 2D texture coordinate prediction residue based on a second quantization step value.

In an example, the second quantization step value is determined based on the first quantization step value. A log 2 of a denominator of the first quantization step value is in a range between 0 and 7. The second quantization step value is one of 1, 2, 4, 8, 16, 32, 64, and 128. The first quantization step value is one of 1, 2, 4, 8, 16, 32, 64, and 128.

In an example, the second quantization step value is equal to a multiple of the first quantization step value.

In an example, the second quantization step value is equal to one of a linear function and a monotonically non-decreasing function of the first quantization step value.

In an example, the second quantization step value is equal to a monotonically non-decreasing function of a quantization error associated with the position prediction of the current vertex. The quantization error is a difference between the quantized position prediction residue and an unquantized position prediction residue for the current vertex.

In an example, the first quantization step value is determined based on the second quantization step value.

In an example, the first quantization step value is equal to a multiple of the second quantization step value.

In an example, the first quantization step value is equal to one of a linear function and a monotonically non-decreasing function of the second quantization step value.

In an example, the first quantization step value is equal to a monotonically non-decreasing function of a quantization error associated with the 2D texture coordinate prediction of the current vertex. The quantization error is a difference between the quantized 2D texture coordinate prediction residue and an unquantized 2D texture coordinate prediction residue for the current vertex.

Then, the process proceeds to (S999) and terminates.

The process (900) can be suitably adapted. Step(s) in the process (900) can be modified and/or omitted. Additional step(s) can be added. Any suitable order of implementation can be used.

FIG. 10 shows a flow chart outlining a process (1000) according to an aspect of the disclosure. The process (1000) can be used in a video encoder. In various aspects, the process (1000) is executed by processing circuitry, such as the processing circuitry that performs functions of the video encoder (103), the processing circuitry that performs functions of the video encoder (303), and the like. In some aspects, the process (1000) is implemented in software instructions, thus when the processing circuitry executes the software instructions, the processing circuitry performs the process (1000). The process starts at (S1001) and proceeds to (S1010).

At (S1010), a position prediction of a current vertex of a base mesh associated with a mesh in a current mesh frame is determined. An attribute prediction of the current vertex is determined. The base mesh includes a subset of a plurality of vertices of the mesh.

At (S1020), a position prediction residue for the position prediction of the current vertex is quantized to generate a quantized position prediction residue. An attribute prediction residue for the attribute prediction of the current vertex is quantized to generate a quantized attribute prediction residue.

At (S1030), the quantized position prediction residue for the position prediction of the current vertex is entropy coded in a bitstream. The quantized attribute prediction residue for the attribute prediction of the current vertex is entropy coded in the bitstream.

In an example, the attribute of the current vertex is a two-dimensional (2D) texture coordinate of the current vertex. The attribute prediction is a 2D texture coordinate prediction. The attribute prediction residue is a 2D texture coordinate prediction residue.

In an example, the quantized position prediction residue for the position prediction of the current vertex is dequantized to obtain the position prediction residue of the position prediction of the current vertex. The quantized 2D texture coordinate prediction residue for the 2D texture coordinate prediction of the current vertex is dequantized to obtain the 2D texture coordinate prediction residue of the current vertex. A position of the current vertex is reconstructed based on the position prediction and the position prediction residue. A 2D texture coordinate for the current vertex is reconstructed based on the 2D texture coordinate prediction and the 2D texture coordinate prediction residue.

A position of a vertex in a mesh (or 3D mesh) may refer to a location of the vertex in a virtual world or a 3D space. The position of the vertex may be defined using a coordinate system, such as a Cartesian coordinate system with three axes: X, Y, and Z. A position prediction of the vertex indicates a prediction value of the position of the vertex. In an example, the position of the vertex may be predicted by positions of one or more neighboring vertices of the vertex.

A 2D texture coordinate (also known as UV coordinate) of a vertex in a 3D model (e.g., a 3D mesh) specifies a position on a 2D texture image that can be mapped to the vertex. The 2D texture coordinate may be used to indicate to a renderer how to "wrap" the texture (e.g., color and detail information) of the 3D model onto the vertex. A 2D texture coordinate prediction of the vertex indicates a prediction value of the 2D texture coordinate of the vertex.

A vertex of a mesh may have various attributes that provide additional information beyond a simple position of the vertex in a 3D space. For example, these attributes define how the vertex interacts with light, textures, and other elements that contribute to a final appearance of the mesh. Examples of the vertex attributes include (1) a position of the vertex, (2) a normal vector that defines a surface orientation at the vertex, (3) 2D coordinates (u, v) of the vertex that can be used to map a texture onto a surface of the mesh, (4) a color associated with the vertex, (5) tangent and bitangent vectors used for advanced lighting calculations, such as for bump mapping and normal mapping techniques, and (6) a bone weight and index of the vertex. In an example, an attribute prediction of a vertex indicates a prediction value of the attribute of the vertex. For example, the attribute of the vertex may be predicted based on attributes of neighboring vertices of the vertex in the mesh.

In an example, the position prediction of the current vertex is determined based on one or more coded vertices according to a multi-parallelogram prediction. The 2D texture coordinate prediction of the current vertex is determined based on the one or more coded vertices according to a stretch prediction algorithm.

In an example, the position prediction residue for the position prediction of the current vertex is quantized based on a first quantization step value. The 2D texture coordinate prediction residue for the 2D texture coordinate prediction of the current vertex is quantized based on a second quantization step value.

Then, the process proceeds to (S1099) and terminates.

The process (1000) can be suitably adapted. Step(s) in the process (1000) can be modified and/or omitted. Additional step(s) can be added. Any suitable order of implementation can be used.

In an aspect, a method of processing mesh data includes processing a bitstream of the mesh data according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, a bitstream of mesh data is processed according to a format rule. The bitstream includes base mesh information of a base mesh, where the base mesh includes a subset of a plurality of vertices of a mesh in a current mesh frame. The format rule specifies that (i) a position prediction of a current vertex of the base mesh and (ii) an attribute prediction of the current vertex are determined. The format rule specifies that (i) a position prediction residue for the position prediction of the current vertex and (ii) an attribute prediction residue for the attribute prediction of the current vertex of the base mesh are determined. The format rule specifies that (i) a position of the current vertex of the base mesh is processed based on the position prediction and the position prediction residue and (ii) an attribute of the current vertex of the base mesh is processed based on the attribute prediction and the attribute prediction residue.

The techniques described above, can be implemented as computer software using computer-readable instructions and physically stored in one or more computer-readable media. For example, FIG. 11 shows a computer system (1100) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
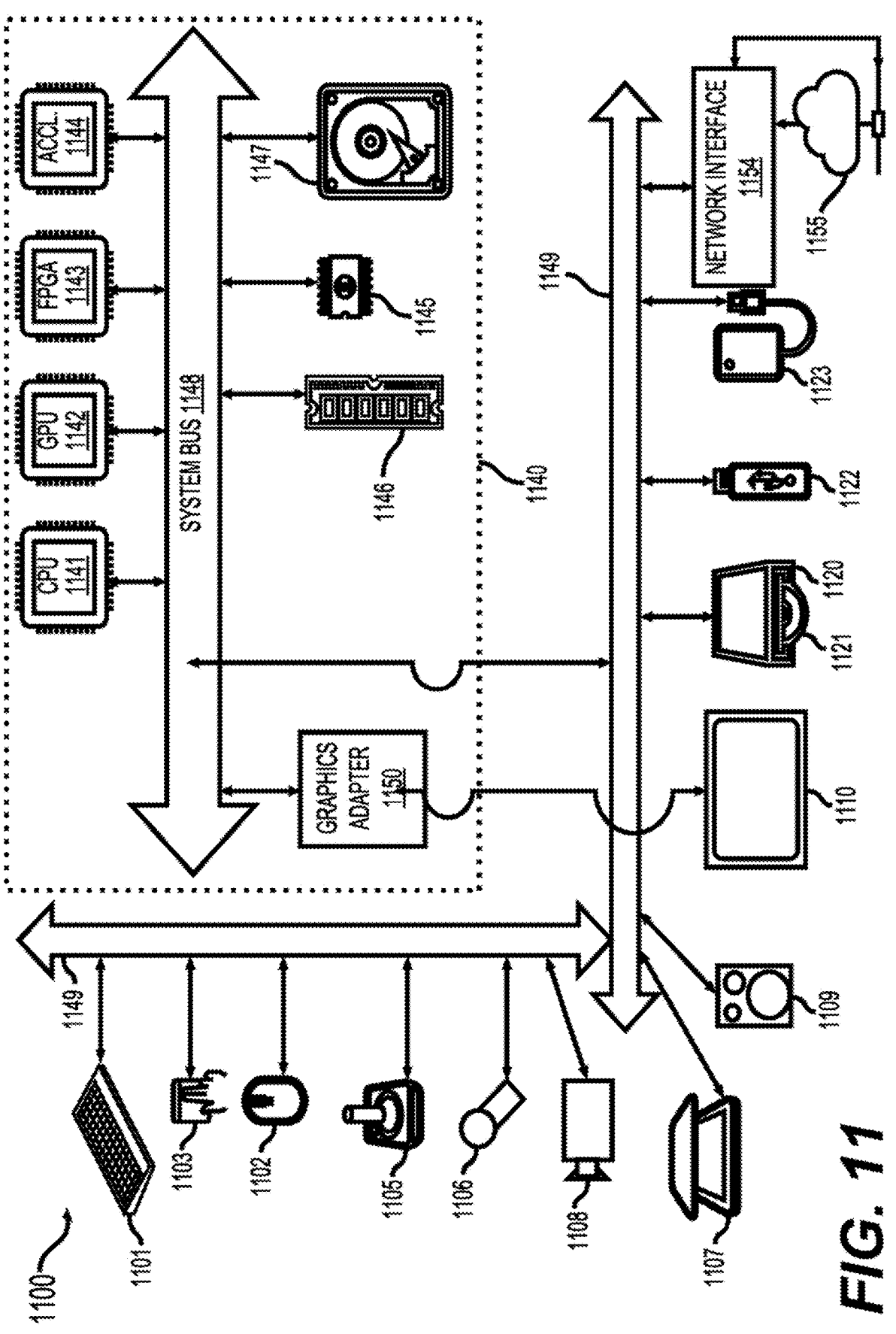
FIG. 11 is a schematic illustration of a computer system in accordance with an aspect of the disclosure.

The components shown in FIG. 11 for computer system (1100) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various aspects of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. An apparatus for mesh decoding, comprising:
processing circuitry configured to:
    receive a bitstream that includes base mesh information of a base mesh, the base mesh including a subset of a plurality of vertices of a mesh in a current mesh frame;
    determine (i) a position prediction of a current vertex of the base mesh and (ii) an attribute prediction of the current vertex;
    determine (i) a position prediction residue for the position prediction of the current vertex based on a first quantization step value and (ii) an attribute prediction residue for the attribute prediction of the current vertex of the base mesh based on a second quantization step value, the first quantization step value being determined based on the second quantization step value or the second quantization step value being determined based on the first quantization step value; and
    reconstruct (i) a position of the current vertex of the base mesh based on the position prediction and the position prediction residue and (ii) an attribute of the current vertex of the base mesh based on the attribute prediction and the attribute prediction residue.

2. The apparatus of claim 1, wherein:
the attribute prediction is a two-dimensional (2D) texture coordinate prediction, and
the processing circuitry is configured to:
    determine the position prediction of the current vertex based on one or more coded vertices according to a multi-parallelogram prediction; and
    determine the 2D texture coordinate prediction of the current vertex based on the one or more coded vertices according to a stretch prediction algorithm.

3. The apparatus of claim 1, wherein:
the attribute prediction is a two-dimensional (2D) texture coordinate prediction and the attribute prediction residue is a 2D texture coordinate prediction residue, and
the processing circuitry is configured to:
    determine a quantized position prediction residue for the position prediction of the current vertex based on a first entropy decoding;
    dequantize the quantized position prediction residue for the position prediction of the current vertex to determine the position prediction residue based on the first quantization step value;
    determine a quantized 2D texture coordinate prediction residue for the 2D texture coordinate prediction for the current vertex based on a second entropy decoding; and
    dequantize the quantized 2D texture coordinate prediction residue for the 2D texture coordinate prediction of the current vertex to determine the 2D texture coordinate prediction residue based on the second quantization step value.

4. The apparatus of claim 3, wherein:
the second quantization step value is determined based on the first quantization step value,
a log 2 of a denominator of the first quantization step value is in a range between 0 and 7,
the second quantization step value is one of 1, 2, 4, 8, 16, 32, 64, and 128, and
the first quantization step value is one of 1, 2, 4, 8, 16, 32, 64, and 128.

5. The apparatus of claim 3, wherein the second quantization step value is equal to a multiple of the first quantization step value.

6. The apparatus of claim 3, wherein the second quantization step value is equal to one of a linear function and a monotonically non-decreasing function of the first quantization step value.

7. The apparatus of claim 3, wherein the second quantization step value is equal to a monotonically non-decreasing function of a quantization error associated with the position prediction of the current vertex, the quantization error being a difference between the quantized position prediction residue and an unquantized position prediction residue for the current vertex.

8. The apparatus of claim 3, wherein the first quantization step value is determined based on the second quantization step value.

9. The apparatus of claim 3, wherein the first quantization step value is equal to a multiple of the second quantization step value.

10. The apparatus of claim 3, wherein the first quantization step value is equal to one of a linear function and a monotonically non-decreasing function of the second quantization step value.

11. The apparatus of claim 3, wherein the first quantization step value is equal to a monotonically non-decreasing function of a quantization error associated with the 2D texture coordinate prediction of the current vertex, the quantization error being a difference between the quantized 2D texture coordinate prediction residue and an unquantized 2D texture coordinate prediction residue for the current vertex.

12. A method of video encoding, comprising:
    determining (i) a position prediction of a current vertex of a base mesh associated with a mesh in a current mesh frame and (ii) an attribute prediction of the current vertex, the base mesh including a subset of a plurality of vertices of the mesh;
    quantizing (i) a position prediction residue for the position prediction of the current vertex to generate a quantized position prediction residue based on a first quantization step value and (ii) an attribute prediction residue for the attribute prediction of the current vertex to generate a quantized attribute prediction residue based on a second quantization step value, the first quantization step value being determined based on the second quantization step value or the second quantization step value being determined based on the first quantization step value; and
    entropy coding (i) the quantized position prediction residue for the position prediction of the current vertex and (ii) the quantized attribute prediction residue for the attribute prediction of the current vertex in a bitstream.

13. The method of claim 12, wherein:
the attribute prediction residue is a two-dimensional (2D) texture coordinate prediction residue, the attribute prediction is a 2D texture coordinate prediction, and
the method further comprises:
    dequantizing (i) the quantized position prediction residue for the position prediction of the current vertex to obtain the position prediction residue of the position prediction of the current vertex and (ii) the quantized 2D texture coordinate prediction residue for the 2D texture coordinate prediction of the current vertex to obtain the 2D texture coordinate prediction residue of the current vertex; and reconstructing (i) a position of the current vertex based on the position prediction and the position prediction residue and (ii) a 2D texture coordinate for the current vertex based on the 2D texture coordinate prediction and the 2D texture coordinate prediction residue.

14. The method of claim 12, wherein:

the attribute prediction residue is a two-dimensional (2D) texture coordinate prediction residue, the attribute prediction is a 2D texture coordinate prediction;

the determining the position prediction residue includes determining the position prediction of the current vertex based on one or more coded vertices according to a multi-parallelogram prediction; and the determining the 2D texture coordinate prediction residue includes determining the 2D texture coordinate prediction of the current vertex based on the one or more coded vertices according to a stretch prediction algorithm.

15. The method of claim 12, wherein:

the attribute prediction residue is a two-dimensional (2D) texture coordinate prediction residue, the attribute prediction is a 2D texture coordinate prediction;

the quantizing the position prediction residue for the position prediction of the current vertex includes quantizing the position prediction residue for the position prediction of the current vertex based on the first quantization step value; and the quantizing the 2D texture coordinate prediction residue for the 2D texture coordinate prediction of the current vertex includes quantizing the 2D texture coordinate prediction residue for the 2D texture coordinate prediction of the current vertex based on the second quantization step value.

16. The method of claim 15, wherein:

the second quantization step value is determined based on the first quantization step value, a log 2 of a denominator of the first quantization step value is in a range between 0 and 7, the second quantization step value is one of 1, 2, 4, 8, 16, 32, 64, and 128, and the first quantization step value is one of 1, 2, 4, 8, 16, 32, 64, and 128.

17. The method of claim 15, wherein the second quantization step value is equal to a multiple of the first quantization step value.

18. The method of claim 15, wherein the second quantization step value is equal to one of a linear function and a monotonically non-decreasing function of the first quantization step value.

19. The method of claim 15, wherein the second quantization step value is equal to a monotonically non-decreasing function of a quantization error associated with the position prediction of the current vertex, the quantization error being a difference between the quantized position prediction residue and an unquantized position prediction residue for the current vertex.

20. A non-transitory computer-readable storage medium storing instructions which when executed by a processor cause the processor to perform an encoding method comprising:

determining (i) a position prediction of a current vertex of a base mesh associated with a mesh in a current mesh frame and (ii) an attribute prediction of the current vertex, the base mesh including a subset of a plurality of vertices of the mesh;

quantizing (i) a position prediction residue for the position prediction of the current vertex to generate a quantized position prediction residue based on a first quantization step value and (ii) an attribute prediction residue for the attribute prediction of the current vertex to generate a quantized attribute prediction residue based on a second quantization step value, the first quantization step value being determined based on the second quantization step value or the second quantization step value being determined based on the first quantization step value;

entropy coding (i) the quantized position prediction residue for the position prediction of the current vertex and (ii) the quantized attribute prediction residue for the attribute prediction of the current vertex in a bitstream; and transmitting the bitstream.

* * * * *